United States Patent
Holtz et al.

(10) Patent No.: US 7,085,779 B2
(45) Date of Patent: Aug. 1, 2006

(54) FILE TREE CHANGE RECONCILER

(75) Inventors: Brian Holtz, San Carlos, CA (US); Vijay Balasubramanian, San Jose, CA (US); Nidheesh Dubey, Fremont, CA (US); Aseem Sharma, Sunnyvale, CA (US); Vivek Pandey, Fremont, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 472 days.

(21) Appl. No.: 10/021,854

(22) Filed: Dec. 12, 2001

(65) Prior Publication Data

US 2002/0184242 A1 Dec. 5, 2002

Related U.S. Application Data

(60) Provisional application No. 60/295,987, filed on Jun. 4, 2001.

(51) Int. Cl.
*G06F 12/00* (2006.01)
*G06F 17/30* (2006.01)

(52) U.S. Cl. .................. 707/200; 707/10; 707/201; 707/203; 711/100; 712/28

(58) Field of Classification Search ........... 395/601, 395/617, 619; 707/1–10, 103, 200–204, 707/102, 104
See application file for complete search history.

(56) References Cited

U.S. PATENT DOCUMENTS

| 4,558,413 | A | | 12/1985 | Schmidt et al. |
| 5,588,147 | A | * | 12/1996 | Neeman et al. ............. 395/601 |
| 5,600,834 | A | | 2/1997 | Howard |
| 5,778,389 | A | * | 7/1998 | Pruett et al. ............... 707/204 |
| 5,956,489 | A | * | 9/1999 | San Andres et al. ........ 709/221 |
| 6,098,078 | A | | 8/2000 | Gehani et al. |

(Continued)

FOREIGN PATENT DOCUMENTS

EP 0 684 558 A1 11/1995

OTHER PUBLICATIONS

Prabhu Ram and Lyman Do, "Extracting Delta for Incremental Data Warehouse Maintenance", Phantom Works Mathematics and Computing Technology, 2000, 220-229.

(Continued)

*Primary Examiner*—Sam Rimell
*Assistant Examiner*—Mellissa M. Chojnacki
(74) *Attorney, Agent, or Firm*—Sonnenschein Nath & Rosenthal LLP

(57) ABSTRACT

Methods and systems are provided for reconciling any changes that have occurred in two file trees since they were last synchronized. A reconciler takes as input two logs of the changes made in the respective file trees. The first log resides on a client computing device, and the second log resides on a server computing device. The reconciler outputs two sets of changes that need to be applied to the respective file trees in order to synchronize them. The reconciler detects and outputs a list of changes that conflict with each other.

16 Claims, 8 Drawing Sheets

U.S. PATENT DOCUMENTS

| | | | |
|---|---|---|---|
| 6,240,414 B1 | 5/2001 | Beizer et al. | |
| 6,243,705 B1 * | 6/2001 | Kucala | 707/10 |
| 6,343,299 B1 * | 1/2002 | Huang et al. | 707/203 |
| 6,694,336 B1 * | 2/2004 | Multer et al. | 707/201 |

OTHER PUBLICATIONS

Sudarshan S. Chawathe and Hector Garcia-Molina, "Meaningful Change Detection in Structured Data," Proceedings of the 1997 ACM SIGMOD International Conference on Management of Data, 1997, pp. 26-37, XP-002228386.

Jason T. L. Wang, et al., "A Tool for Tree Pattern Matching," Proceedings of the International Conference on Tools for Artificial Intelligence, San Jose, CA, Nov. 5-8, 1991, pp. 436-444, XP-010025519.

S. Balasubramaniam and Benjamin C. Pierce, "What is a File Synchronizer?" MOBICOM '98. Proceedings of the 4th Annual ACM/IEEE International Conference on Mobile Computing and Networking, Dallas, TX, Oct. 25-30, 1998, pp. 98-108, XP-000850260.

* cited by examiner

FILE TREE CHANGE RECONCILER

RELATED APPLICATIONS

This application claims the benefit of now abandoned U.S. Provisional Patent Application No. 60/295,987 filed on Jun. 4, 2001, and co-pending U.S. Non-Provisional Patent Application No. 10/021,943 filed on Dec. 12, 2001, the disclosures of which are hereby incorporated by references.

BACKGROUND OF THE INVENTION

Field of the Invention

The present invention relates to file tree reconcilers, and in particular to a method of reconciling any changes that have occurred in two file trees since they were last synchronized.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all rights whatsoever.

BACKGROUND ART

A way to organize files and folders of a user on a computer is by arranging them in a structure commonly known as a tree. Oftentimes, this arrangement is changed by moving, adding, or deleting files and folders. When this happens, a new tree is generated. It is helpful to find and reconcile the differences between the old and new trees. Reconciling the differences found in the old and new trees is currently very difficult, and will be further explained below. Before discussing this problem, however, an overview of a tree data structure is provided.

Tree Data Structure

A tree data structure is illustrated in FIG. 1. The apex of the tree 100 is commonly called the root. The root is usually a folder that contains all other sub-folders and files of a user. The root is the starting location of all folders and files of a computer user from where links spread out like branches of a tree to other sub-folders and files.

The nodes (i.e., the actual files) of a tree are denoted by parent, child, leaf, and non-leaf nodes. A parent is any node that has a branch leading down to one or more lower nodes. Referring to FIG. 1, root 100 is one example of a parent. A child is any node that has a branch leading up to a higher node. All nodes in FIG. 1 except the root node is a child node. This child node category can be further segregated into left and right child depending upon the location of the child node with respect to its parent. Node 101 is a right child node, while node 102 is a left child node of parent node 103. Node 107 is a right child node, while node 108 is a left child node of parent node 109. A leaf node is any node that does not have any branches leading to lower levels in the tree (for example, 110). All nodes at the bottom most level of the tree (for example, 104, 105, 106, 111, 112, and 113) are leaf nodes. In contrast, all other nodes are categorized as non-leaf nodes as they have a child node under them (for example, 100).

Tree Modification

When a user makes changes to the folders and files, for instance by deleting or adding a file, or changing its contents, these changes have to be correctly incorporated into the tree. Typically, a new tree is generated every time a change is made. This new tree is then compared to the old tree, and all necessary changes are merged to create one updated tree. This requires that the old state be remembered and compared with the new state in order to reconcile any differences, which is wasteful of resources.

File Tree Reconciler

In order to reconcile any differences between an old and a new file tree, the two trees have to be compared. A utility, commonly called a comparator, compares the two file tree descriptions and generates a sequenced log of changes that transforms the old tree to a new tree. A complete description of the type of file tree comparator is contained in co-pending provisional U.S. patent application "File Tree Comparator", Ser. No. 60/296,065, filed Jun. 4, 2001, and co-pending non-provisional U.S. patent application "File Tree Comparator", Ser. No. 10/021,943, filed on Dec. 12, 2001, and assigned to the assignee of this patent application. After the changes have been recorded, another utility, commonly known as a reconciler, takes in as its input the log of changes (if one is available) from both the old and the new file trees and reconciles any changes that have occurred since the last synchronization.

There are several commercially available reconcilers that find the differences in two file tree structures. One file tree reconciler is called Xfiles. Xfiles allows comparing, reconciling any differences, and merging two file trees over a network. In operation, Xfiles reconciles any changes with the aid of a client/server program (graphical user interface on the client) that traverses a file tree and reports any files that are missing on the server or client machines, or are different.

The main drawback with Xfiles is that after the entire tree is traversed in order to reconcile any changes, the entire tree (along with the changes) has to be transferred to the other side. If the tree is very large, a substantial amount of time might be wasted transferring large portions of the tree that are not modified. Moreover, if the network connection is slow, or network traffic high, Xfiles becomes prohibitively wasteful of resources.

A second drawback with Xfiles is that it requires a "diff" command to find and reconcile any differences between the two trees. The "diff" command is a Unix command. Unix commands cannot be used on non-Unix operating systems, and since most operating systems are non-Unix, it prohibits the widespread use of Xfiles. Wrapper programs may be created in order to run the Xfiles utility and have its functions on non-Unix operating systems, but this is time consuming and difficult.

Another file tree reconciler, termed Teamware, includes methods for reconciling any changes in file trees, with the assumption that the file trees are of a special type—containing only source code control system (SCCS) folders and files-that are directly annotative. Using Teamware, developers may each be assigned a separate sub-directory of a single root directory designated as a parent workspace for the current project. The parent workspace contains the original copies of each project file and records of each set of changes to each file.

The developers obtain copies of project files for reading and editing purposes within their individual workspaces, and to record any modifications they make in a central location later on. A locking mechanism in SCCS prevents two developers from checking out the same file for editing at the same time. Teamware, is restrictive because it detects file tree changes based on modification times rather than on change logs. Furthermore, since Teamware automatically annotates only SCCS folders and files, it has no application to most file tree systems.

Another file tree reconciler is called Unison. Unison is a file synchronization tool for Unix and Windows operating systems. It allows two replicas of a collection of files, folders, or directories to be stored on different hosts or different disks on the same host, modified separately, and then brought up to date by propagating the changes in each replica to the other. Unison sends from one side (server or client) to the other the entire log, and makes the receiving side responsible for finding the differences in the files, folders, and directories of both sides and reconciling them. This system works well only because the utility has an indefinitely growing version log for each synced file, which is pruned only when all known synchronizers have seen the pruned versions. There is a time limit (usually a month) when the utility abandons files that have not been synced in order to prune the size of the log.

Unison, however, creates a log for the entire file tree and sends it across the network. If the file tree is large, the time involved in transmitting the log for the entire file tree can be time consuming, especially if the network connection is slow, or the network is highly congested. Moreover, if a file is not in use beyond the time limit, it is abandoned by the log. If the file has been abandoned, changes made to it may not be reflected in the log that is sent across to the other side. Furthermore, Unison detects file tree changes based on modification times rather than changes in the log. As mentioned earlier, since the entire file tree is sent across, this is a time consuming operation.

SUMMARY OF THE INVENTION

The embodiments of the present invention pertain to a file tree change reconciler. According to one or more embodiments, any changes that have occurred in two file trees since they were last synchronized are recorded. In one embodiment, the reconciler takes as input two logs of changes made in two respective file trees. Using the logs, it generates two sequences of operations. One sequence is designed to transfer the second tree to the first. The other is designed to transfer the first tree to the second. Once applied, the sequence of changes reconciles the two trees. In one embodiment, the first log resides on a client computing device, and the second log resides on a server computing device. According to another embodiment, the reconciler outputs two sets of changes that need to be applied to the respective file trees in order to synchronize them. According to another embodiment, the reconciler detects and outputs a list of changes that conflict with each other.

BRIEF OF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The embodiments of the present invention pertain to a file tree reconciler. In the following description, numerous specific details are set forth to provide a more thorough description of embodiments of the invention. It will be apparent, however, to one skilled in the art, that the embodiments of the present invention may be practiced without these specific details. In other instances, well known features have not been described in detail so as not to obscure the invention.

File Tree Reconciler

Figure 1:
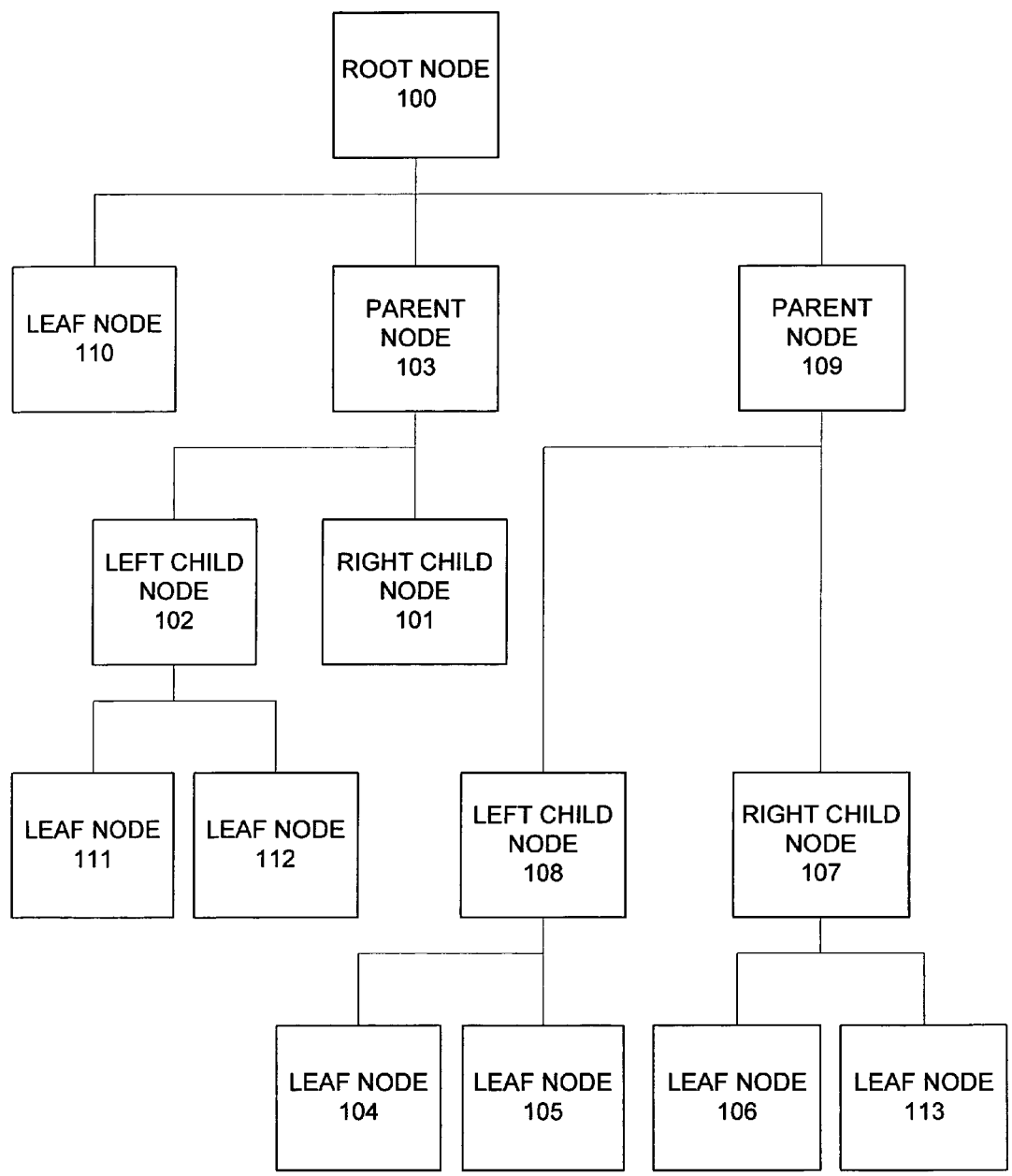
FIG. 1 is an illustration of a file tree structure.
Figure 2A:
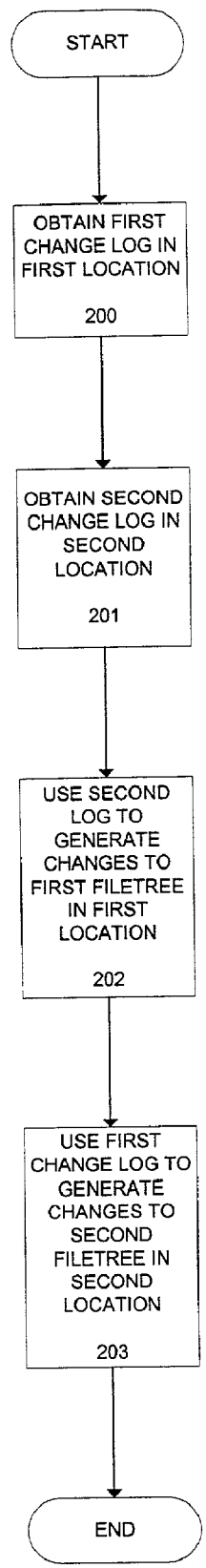
FIG. 2A is a flowchart of a file tree reconciler according to one embodiment of the present invention.
Figure 2B:
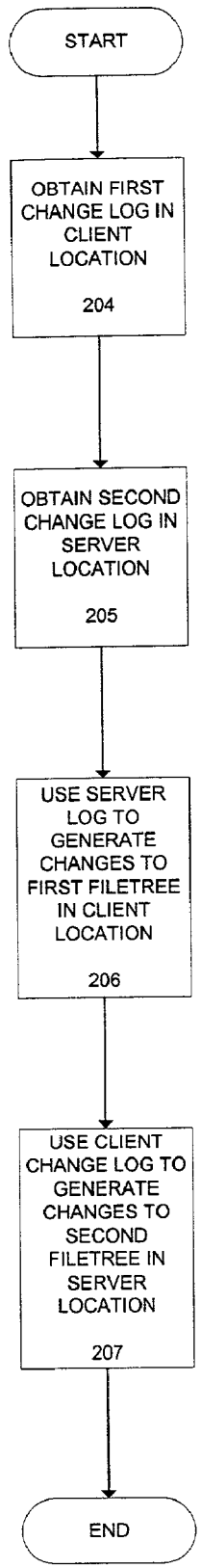
FIG. 2B is a flowchart of a file tree reconciler according to one embodiment of the present invention.

According to one embodiment of the present invention, a file tree reconciler receives in as input two logs of change operations made to two file trees. The reconciliation process is illustrated in FIGS. 2A and 2B. At block 200 of FIG. 2A, a first log is obtained. This first log can be obtained from a client as illustrated at block 204 in FIG. 2B. At block 201 of FIG. 2A, a second log is obtained. This second log can be obtained from a server as illustrated at block 205 in FIG. 2B. The reconciler converts each side's change log into a sequence of changes that can be applied to the other side. The change operations may be one of create, delete, modify, rename, or reparent. At block 202, the reconciler converts the change log of the first log. If this first log is from the client, the conversion of the client change log is illustrated at block 206 in FIG. 2B. At block 203 the reconciler converts the change log of the second log. If this second log is from the server, the conversion of the server change log is illustrated at block 207 in FIG. 2B.

Figure 7:
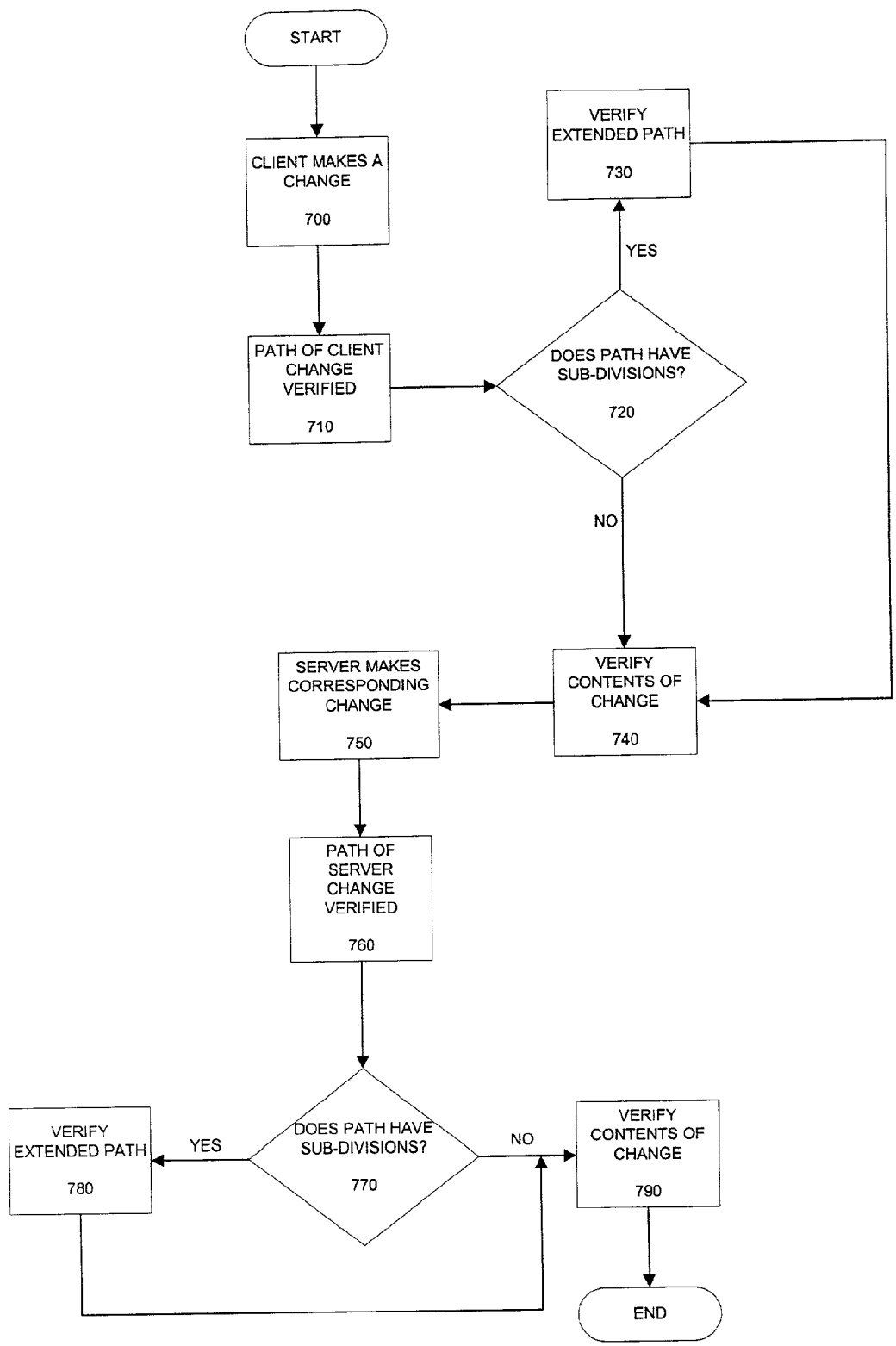
FIG. 7 is a flowchart illustrating an initial synchronization between a client and a server.

FIG. 7 illustrates an example of an initial synchronization in which a client starts with a file, for example, "Status.html" and a server starts with a file, for example, "PseudoRegistry.java" inside a folder, for example, "src". At block 700, a client makes a change, for example to add contents to file Status.html. At block 710, the path of the client change is verified, for example Status.html. At block 720, a check is made to verify if the path has any sub-divisions. In the example, the client makes addition to a file, which lies in the root directory of the client, so there is no further sub-divisions. At block 730, if the path has sub-divisions, then the extended path of the client change is verified before going to block 740, else at block 740 the contents of the change are verified, for example<!doctype html public "-// w3c//dtd html [. . . ]>.

Next at block 750, a server makes the corresponding changes based on the client changes, for example to add contents to src. At block 760, the path of the server change is verified, for example src. At block 770, a check is made to verify if the path has any subdivisions. In the example src is a directory that contains file PseudoRegistry.java where the additions have to be made. At block 780, if the path has sub-divisions, for example src/PseudoRegistry.java, then the extended path of the server change is verified before going to block 790, else at block 790 the contents of the change are verified, for example<package com.sun.PortalSyncServer; impor [. . . ]>.

An example of a client's version of its "briefcase index tree" that is used to detect subsequent changes on its side after a synchronization operation described above may look like:

Objects to check for changes(1):
  MappedContentIndex
  path=/tmp/mirror/
  ContentIndex
  children(2):
  ContentIndex
  path=Status.html
  content signature: OAhokamqGRL01alcS
  MappedContentIndex
  path=src
  content signature: rXARIRMIcOQmcxo4n6
  ContentIndex
  children(1):
  ContentIndex
  path=src/PseudoRegistry.java
  content signature: snMGfFSna01gqZV It should be noted here that while /tmp/mirror/ is a container for objects that are in the partnership, the container itself is not in the partnership. In other words, if the container gets renamed, then that change is not propagated to the other side.

Figure 3:
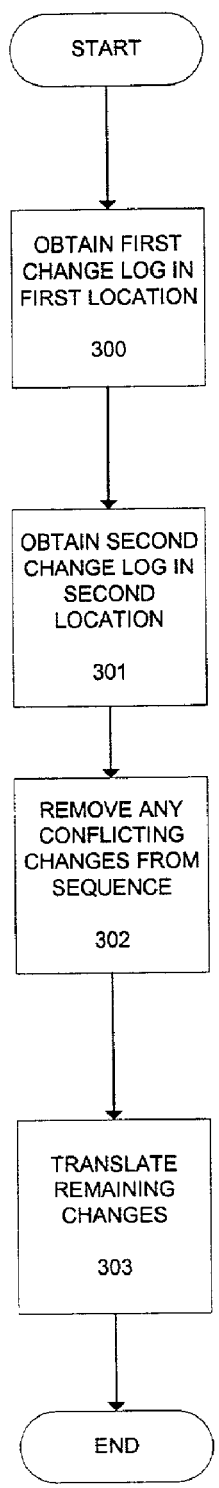
FIG. 3 is a flowchart of one embodiment of the present invention.

Since there are no conflicts in the above example, the server tree is identical to the client's tree, except for the path of the synchronized folder. The path of the client in the above example is "Status.html", while that of the server is "src". An example of a server's version of its "briefcase index tree" as a result of subsequent changes on its side after a synchronization operation described above may look like:

Objects to check for changes(1):
  MappedContentIndex
  path=/home/username/directoryname/ (for example, /home/john/master/)
  ContentIndex
  children(2):
  ContentIndex
  path=Status.html
  content signature: OAhokamqGRL01alcS
  MappedContentIndex
  path=src
  content signature: rXARIRMIcOQmcxo4n6
  ContentIndex
  children(1):
  ContentIndex
  path=src/PseudoRegistry.java
  content signature: snMGfFSna01gqZV There is another kind of synchronization report where only the changes are sent, not a fall census of files/folders as in the synchronization process seen above. For example, if a client edits the Status.html file, while a server deletes the PseudoRegistry.java file, then the client's version of its "briefcase index tree" that is used to detect subsequent changes on its side after a synchronization operation described above may look like:

Objects to check for changes(1):
  MappedContentIndex
  path=/tmp/mirror/
  ContentIndex
  children(2):
  ContentIndex
  path=Status.html
  Contents(142)
  Content signature: U713Jns2PJGVwZ8R
  MappedContentIndex
  path=src
  ContentIndex
  Content signature: 0OwsnMGfFSnaO1gqZ Since there are no conflicts, a server's version of its "briefcase index tree" that is used to detect subsequent changes on its side after a synchronization operation described above is similar to a client's version of its "briefcase index tree" except for the path of the synchronized folder, and may look like:

Objects to check for changes(1):
  MappedContentIndex
  path=/home/username/directoryname/ (for example, /home/john/master/)
  ContentIndex
  children(2):
  ContentIndex
  path=Status.html
  Contents(142)
  Content signature: U713Jns2PJGVwZ8R
  MappedContentIndex
  path=src
  ContentIndex
  Content signature: 0OwsnMGfFSnaO1gqZ According to one embodiment, prior to converting the two change logs, the reconciler removes any conflicting changes from the sequence, and translates the remaining changes so as to take account of the other side's parallel changes. This embodiment of the present invention is shown in FIG. 3. At block 300, a first log is obtained. At block 301, a second log is obtained. At block 302, the reconciler removes any conflicting changes, and at block 303, it translates the remaining changes so as to take account of the other side's parallel changes.

Figure 4:
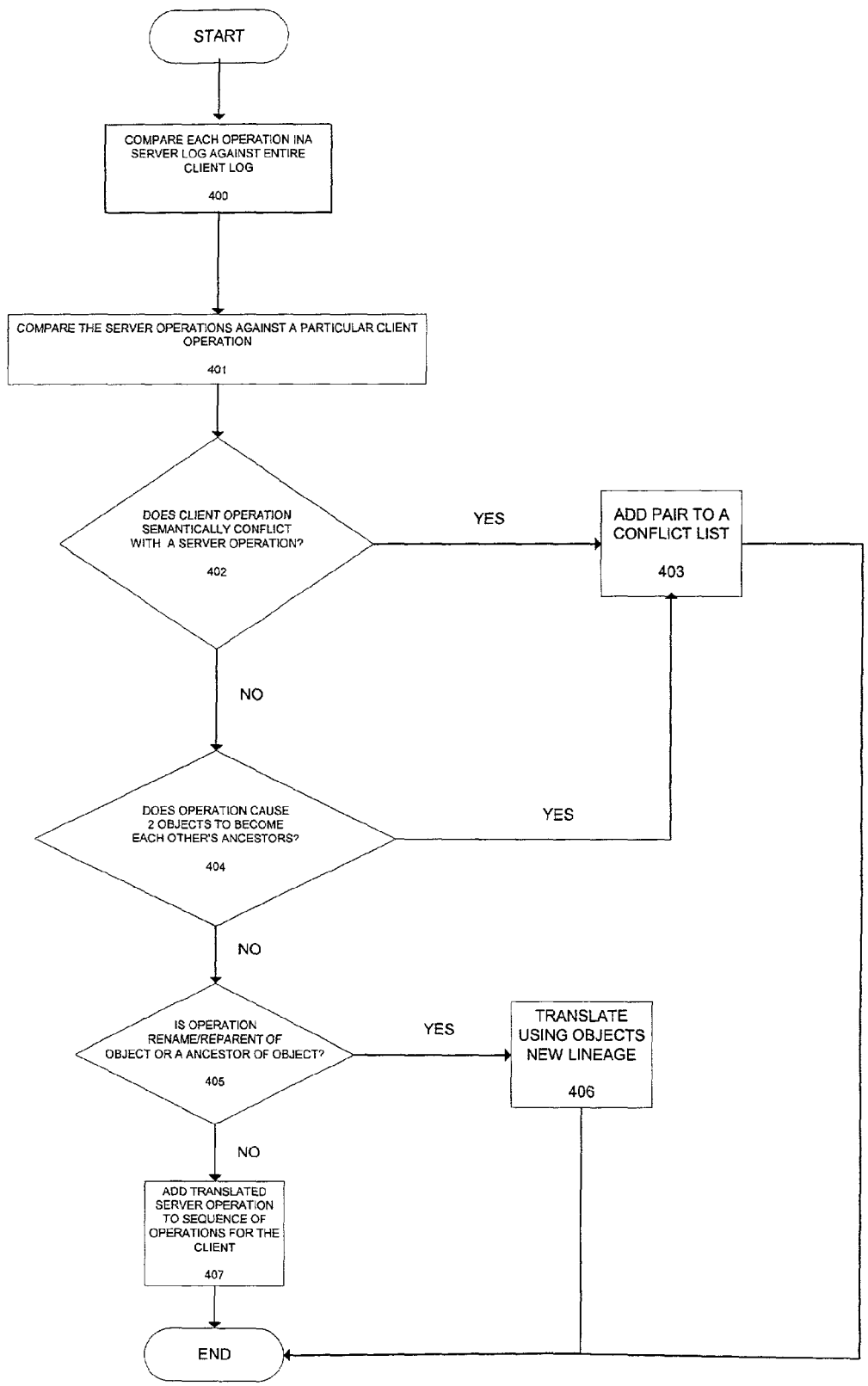
FIG. 4 is a flowchart illustrating the steps taken to compare a server operation against a particular client operation.

According to another embodiment, the reconciler converts the server log which is shown in FIG. 4. At block 400, for each operation in a server log, the reconciler compares it against the entire client log. At block 401, for each operation in a client log, the reconciler compares the server operation against the particular client operation. At block 402, the reconciler checks to see if a client operation semantically conflicts with a server operation. If the client operation semantically conflicts with the server operation, the pair is added to a conflict list at block 403. At block 404, the reconciler checks to see if the operation causes two objects to become each other's ancestors (an unresolvable loop if not attended to). If the operation is found to create the above problem, then the pair is added to the conflict list at block 403.

At block 405, the reconciler checks to see if the client operation is a rename or reparent of the object of the server operation, or of one of that object's ancestors in the tree. If block 405 is positive, then the server operation is translated to refer to the object using its new lineage at block 406. If on the other hand there are no conflict, rename, or reparent issues, then the translated server operation is added to the sequence of operations that the client is asked to perform at block 407.

Figure 5:
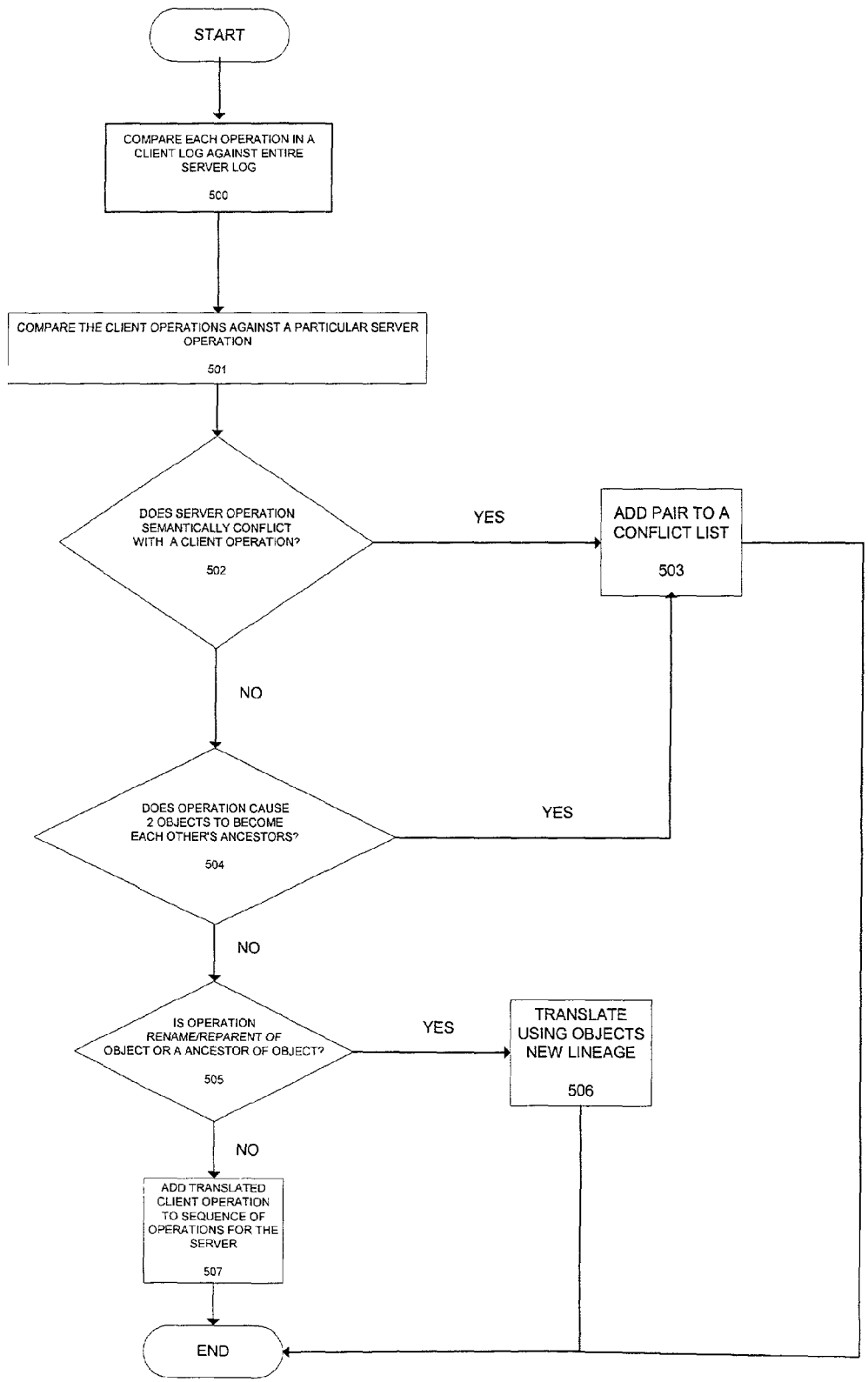
FIG. 5 is a flowchart illustrating the steps taken to compare a client operation against a particular server operation.

According to another embodiment, the reconciler converts the client log which is seen in FIG. 5. It converts the client log by generating a sequence of operations to be performed on the server's file tree. At block 500, for each operation in a client log, the reconciler compares it against the entire server log. At block 501, for each operation in a server log, the reconciler compares the client operation against the particular server operation at block 501. At block 502, the reconciler checks to see if a server operation semantically conflicts with a client operation. If the server operation semantically conflicts with the client operation, the pair is added to a conflict list at block 503. At block 504, the reconciler checks to see if the operation causes two objects to become each other's ancestors (an unresolvable loop if not attended to). If the operation is found to create the above problem, then the pair is added to the conflict list at block 503.

At block 505, the reconciler checks to see if the server operation is a rename or reparent of the object of the client operation, or of one of that object's ancestors in the tree. If block 505 is positive, then the client operation is translated to refer to the object using its new lineage at block 506. If there are no conflict, rename, or reparent issues, then the translated client operation is added to the sequence of operations that the server is asked to perform at block 507.

The only difference in the conversion of the client log as compared to the server log is that all conflicts are discarded since they are the same as those generated from the server log conversion.

Embodiment of a Computer Execution Environment

Figure 6:
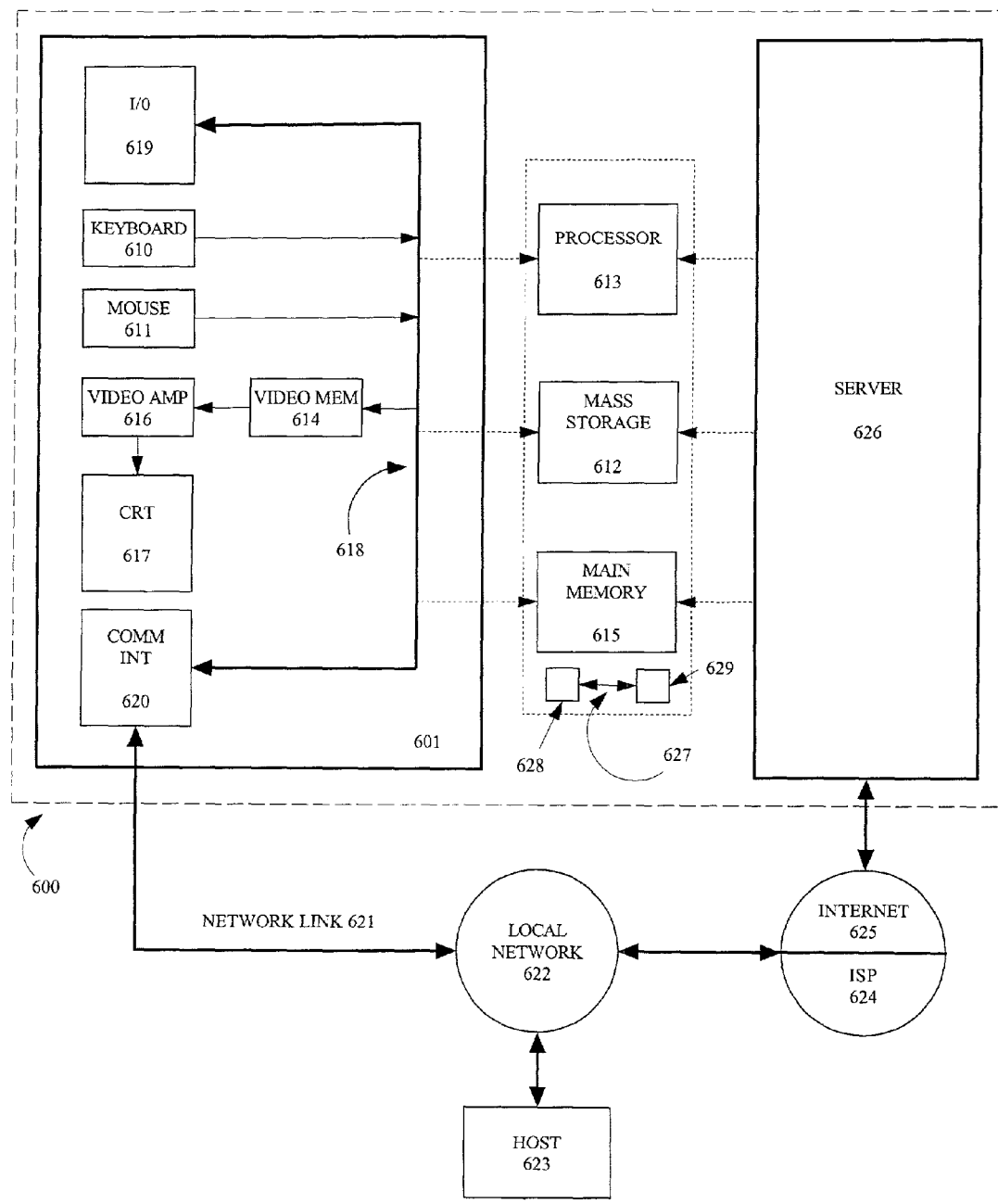
FIG. 6 is an illustration of an embodiment of a computer execution environment.

An embodiment of the invention can be implemented as computer software in the form of computer readable code executed in a desktop general purpose computing environment such as environment 600 illustrated in FIG. 6, or in the form of bytecode class files running in such an environment. A keyboard 610 and mouse 611 are coupled to a bi-directional system bus 618. The keyboard and mouse are for introducing user input to a computer 601 and communicating that user input to processor 613. Computer 601 may also include a communication interface 620 coupled to bus 618.

Communication interface 620 provides a two-way data communication coupling via a network link 621 to a local network 622. For example, if communication interface 620 is an integrated services digital network (ISDN) card or a modem, communication interface 620 provides a data communication connection to the corresponding type of telephone line, which comprises part of network link 621. If communication interface 620 is a local area network (LAN) card, communication interface 620 provides a data communication connection via network link 621 to a compatible LAN. Wireless links are also possible. In any such implementation, communication interface 620 sends and receives electrical, electromagnetic or optical signals, which carry digital data streams representing various types of information.

Network link 621 typically provides data communication through one or more networks to other data devices. For example, network link 621 may provide a connection through local network 622 to local server computer 623 or to data equipment operated by ISP 624. ISP 624 in turn provides data communication services through the world wide packet data communication network now commonly referred to as the "Internet" 625. Local network 622 and Internet 625 both use electrical, electromagnetic or optical signals, which carry digital data streams. The signals through the various networks and the signals on network link 621 and through communication interface 620, which carry the digital data to and from computer 600, are exemplary forms of carrier waves transporting the information.

Processor 613 may reside wholly on client computer 601 or wholly on server 626 or processor 613 may have its computational power distributed between computer 601 and server 626. In the case where processor 613 resides wholly on server 626, the results of the computations performed by processor 613 are transmitted to computer 601 via Internet 625, Internet Service Provider (ISP) 624, local network 622 and communication interface 620. In this way, computer 601 is able to display the results of the computation to a user in the form of output. Other suitable input devices may be used in addition to, or in place of, the mouse 601 and keyboard 600. I/O (input/output) unit 609 coupled to bi-directional system bus 608 represents such I/O elements as a printer, A/V (audio/video) I/O, etc.

Computer 601 includes a video memory 614, main memory 615 and mass storage 612, all coupled to bi-directional system bus 618 along with keyboard 610, mouse 611 and processor 613, and file tree reconciler 627 which reconciles two logs of changes made in file trees 628 (old file tree index) and 629 (new file tree index). One sequence is designed to transfer file tree 628 to file tree 629, and the other sequence is designed to transfer file tree 629 to file tree 628.

As with processor 613, in various computing environments, main memory 615 and mass storage 612, can reside wholly on server 626 or computer 601, or they may be distributed between the two. Examples of systems where processor 613, main memory 615, and mass storage 612 are distributed between computer 601 and server 626 include the thin-client computing architecture developed by Sun Microsystems, Inc., the palm pilot computing device, Internet ready cellular phones, and other Internet computing devices.

The mass storage 612 may include both fixed and removable media, such as magnetic, optical or magnetic optical storage systems or any other available mass storage technology. Bus 618 may contain, for example, thirty-two address lines for addressing video memory 614 or main memory 615. The system bus 618 also includes, for example, a 32-bit data bus for transferring data between and among the components, such as processor 613, main memory 615, video memory 614, and mass storage 612. Alternatively, multiplex data/address lines may be used instead of separate data and address lines.

In one embodiment of the invention, the processor 613 is a microprocessor manufactured by MOTOROLA, such as the 680×0 processor or a microprocessor manufactured by INTEL, such as the 80×86, or PENTIUM processor, or a SPARC microprocessor from Sun Microsystems, Inc. However, any other suitable microprocessor or microcomputer may be utilized. Main memory 615 is comprised of dynamic random access memory (DRAM). Video memory 614 is a dual-ported video random access memory. One port of the video memory 614 is coupled to video amplifier 616. The video amplifier 616 is used to drive the cathode ray tube (CRT) raster monitor 617. Video amplifier 616 is well known in the art and may be implemented by any suitable apparatus. This circuitry converts pixel data stored in video memory 614 to a raster signal suitable for use by monitor 617. Monitor 617 is a type of monitor suitable for displaying graphic images.

Computer 601 can send messages and receive data, including program code, through the network(s), network link 621, and communication interface 620. In the Internet example, remote server computer 626 might transmit a requested code for an application program through Internet 625, ISP 624, local network 622 and communication interface 620. The received code may be executed by processor 613 as it is received, and/or stored in mass storage 612, or other non-volatile storage for later execution. In this manner, computer 600 may obtain application code in the form of a carrier wave. Alternatively, remote server computer 626 may execute applications using processor 613, and utilize mass storage 612, and/or video memory 615. The results of the execution at server 626 are then transmitted through Internet 625, ISP 624, local network 622, and communication interface 620. In this example, computer 601 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, a file tree change reconciler is described in conjunction with one or more specific embodiments. The embodiments of the present invention are defined by the following claims and their full scope of equivalents.

We claim:

1. A method of reconciling changes made to a first file tree and a second file tree comprising:
   receiving a first change log corresponding to said first file tree and a second change log corresponding to said second file tree;
   determining a first set of changes to make to said first file tree using said second change log;
   determining a second set of changes to make to said second file tree using said first change log;
   reconciling said first and said second file trees using said first and said second set of said change logs;
   detecting one or more changes in said first set that conflict with said second set; and
   determining whether reconciling said first and said second file trees creates an unresolvable loop in at least one of said first and said second file trees.

2. The method of claim 1 wherein detecting one or more changes that conflict comprises:
   generating said conflict list.

3. The method of claim 1 wherein said first file tree resides on a client.

4. The method of claim 1 wherein said second file tree resides on a server.

5. An article of manufacture comprising:
   a computer usable medium having computer readable program code embodied therein for reconciling changes made to a first file tree and second file tree, said computer readable program code in said article of manufacture comprising:
   computer readable program code configured to cause said computer to receive a first change log corresponding to said first file tree and a second change log corresponding to said second file tree;
   computer readable program code configured to cause said computer to determine a first set of changes to make to said first file tree using said second change log;
   computer readable program code configured to cause said computer to determine a second set of changes to make to said second file tree using said first change log;
   computer readable program code configured to cause said computer to reconcile said first file tree and said second file tree using said first and said second set of change logs;
   computer readable program code configured to cause said computer to detect one or more changes in said first set that conflict with said second set; and
   computer readable program code configured to cause said computer to determine whether reconciling said first and said second file trees creates an unresolvable loop in at least one of said first and said second file trees.

6. The article of manufacture of claim 5 further comprising:
   computer readable program code configured to cause said computer to generate a conflict list.

7. The article of manufacture of claim 5 wherein said first file tree resides on a client.

8. The article of manufacture of claim 5 wherein said second file tree resides on a server.

9. A computer program product comprising:
   a computer usable medium having computer readable program code embodied therein configured to reconcile changes made to a first and a second file tree, said computer program product comprising:
   computer readable code configured to cause a computer to receive a first change log corresponding to a first file tree and a second change log corresponding to a second file tree;
   computer readable code configured to cause a computer to determine a first set of changes to make to said first file tree using said second change log;
   computer readable code configured to cause a computer to determine a second set of changes to make to said second file tree using said first change log;
   computer readable code configured to cause a computer to reconcile said first and said second file trees using said first and said second set of change logs;
   computer readable code configured to cause a computer to detect one or more changes in said first set that conflict with said second set; and
   computer readable code configured to cause a computer to determine whether reconciling said first and said second file trees creates an unresolvable loop in at least one of said first and said second file trees.

10. The computer program product of claim 9 further comprising:
    computer readable code configured to generate a conflict list.

11. The computer program product of claim 9 wherein said first file tree resides on a client.

12. The computer program product of claim 9 wherein said second file tree resides on a server.

13. A system for reconciling changes made to a first and a second file tree comprising:
    a memory having a program that receives a first change log corresponding to a first file tree and a second change log corresponding to a second file tree, determines a first set of changes to make to said first file tree using said second change log,
    determines a second set of changes to make to said second file tree using said first change log,
    reconciles said first and said second file trees using said first and said second set of change logs,
    detects one or more changes in said first set that conflict with said second set,
    determines whether reconciling said first and said second file trees creates an unresolvable loop in at least one of said first and said second file trees; and
    a processor for running the program.

14. The system of claim 13 wherein detecting one or more changes that conflict comprises:
    generating said conflict list.

15. The system of claim 13 wherein said first file tree resides on a client.

16. The system of claim 13 wherein said second file tree resides on a server.

* * * * *